United States Patent [19]
Ireland

[11] 3,910,524
[45] Oct. 7, 1975

[54] DOWNRIGGER, MOTOR AND REEL

[76] Inventor: Harold Ireland, 26235 W. Warren, Dearborn Heights, Mich. 48127

[22] Filed: Jan. 7, 1974

[21] Appl. No.: 431,229

[52] U.S. Cl. .......... 242/106; 43/6.5; 43/43.12; 242/84.1 A; 242/84.1 M; 242/86
[51] Int. Cl.² .......... A01K 89/012; A01K 91/00; B65H 75/34
[58] Field of Search ......... 242/106, 84.1 A, 84.1 M, 242/84.5 R, 99; 43/6.5, 4, 43.12, 21

[56] References Cited
UNITED STATES PATENTS

| | | | |
|---|---|---|---|
| 2,580,130 | 12/1951 | Rowdon | 43/21.2 |
| 2,919,489 | 1/1960 | Espinosa | 242/106 X |
| 3,049,829 | 8/1962 | Clapp | 43/6.5 |
| 3,248,819 | 5/1966 | Stealy | 43/21 |
| 3,719,331 | 3/1973 | Harsch | 242/106 |
| 3,835,571 | 9/1974 | Berry | 242/106 X |

*Primary Examiner*—Billy S. Taylor
*Attorney, Agent, or Firm*—Whittemore, Hulbert & Belknap

[57] ABSTRACT

A downrigger for fishing is provided. The downrigger functions to extend and retract a line having a heavy weight attached thereto. A fish line including a fish hook is normally detachably fastened to the line carrying the heavy weight. The downrigger includes an electrically actuated power package having a reversible electric motor connected to a reel for extending and retracting the line. The electrical control means are connected to the motor to cause de-energization of the motor upon retraction of the line to a desired extent.

3 Claims, 7 Drawing Figures

U.S. Patent  Oct. 7,1975  Sheet 1 of 2  3,910,524

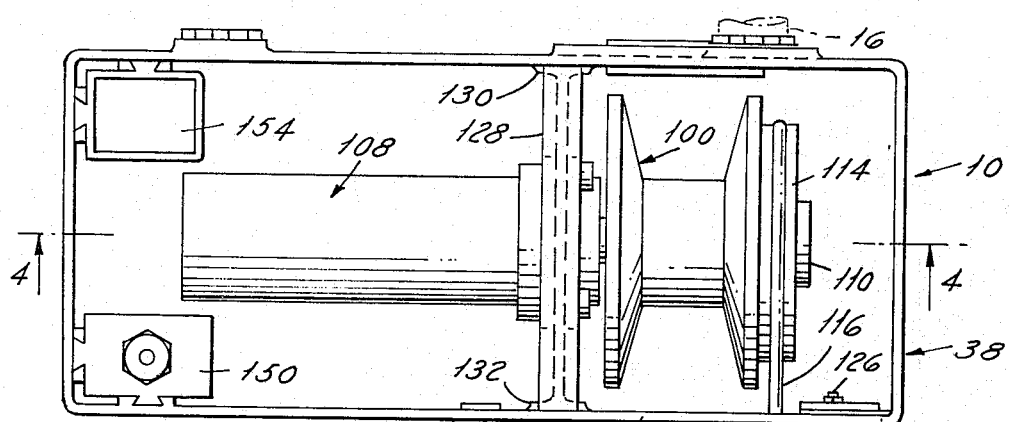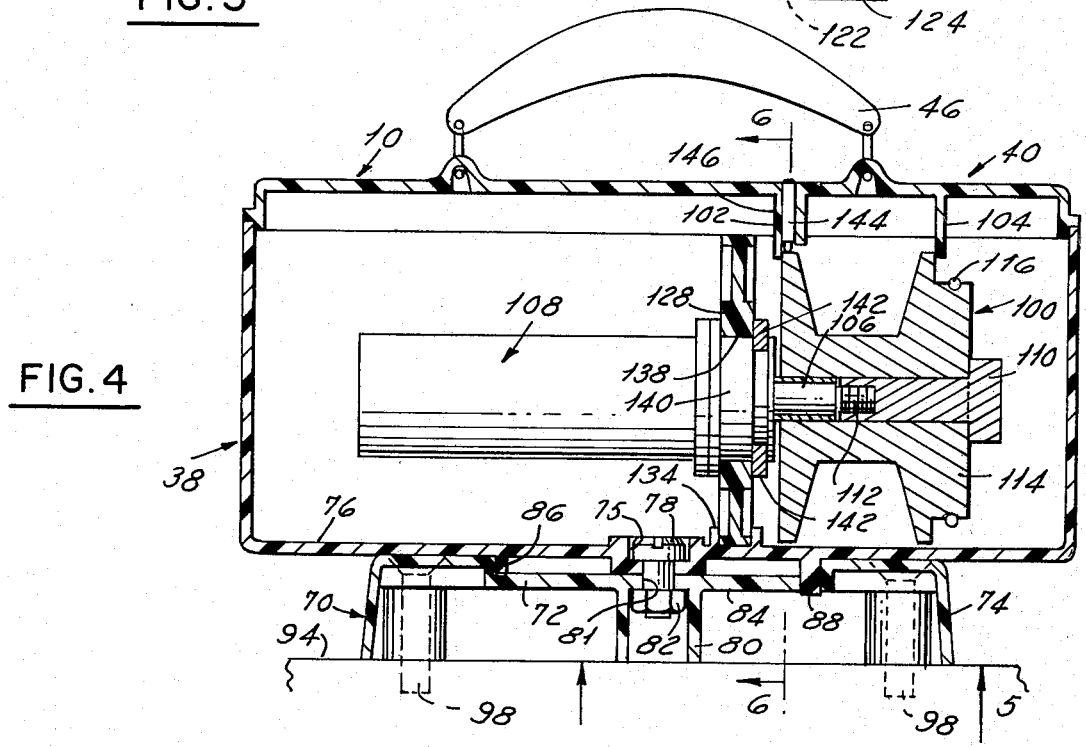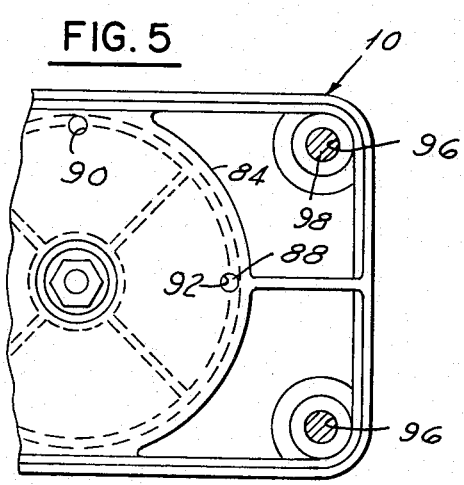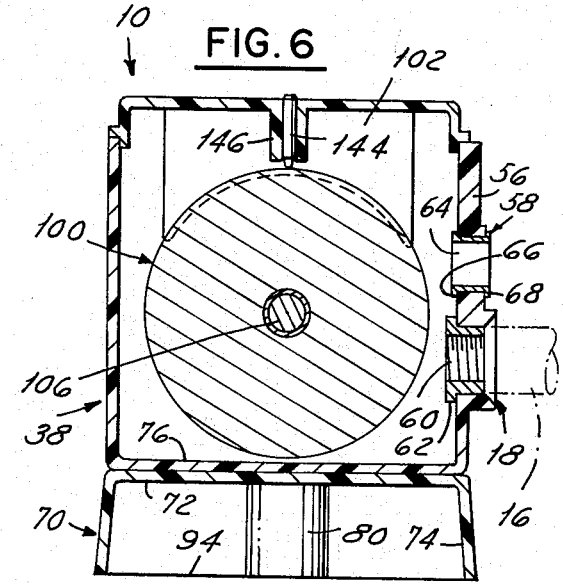

DOWNRIGGER, MOTOR AND REEL

BACKGROUND OF THE INVENTION

A downrigger is a fishing implement used in conjunction with a regular fishing rod. The downrigger has a line which is wound on a reel. A heavy weight is placed at the end of the downrigger line. The downrigger line is detachably fastened to the fishing line which has the usual fish hook and lure or bait attached to it. Both lines are lowered into the water to the desired depth. When a fish is hooked, the fishing line is separated from the downrigger line as a consequence of the fish pulling on the fish hook to free itself. The fisherman may then play the fish without having the heavy weight to contend with along with the fish.

In the past, downriggers have been provided with manually operable reels. Electrical devices have been suggested, however, proposed electrical devices have not been entirely satisfactory. Prior art devices are exemplified, for example, in U.S. Pat. Nos. 3,139,992; 3,295,832; 3,524,606; 3,536,298.

The present invention provides an electrically operated downrigger which is relatively simple in construction, capable of easy repair, provided with means for easy mounting on the stern of a boat and is of rugged and durable construction.

SUMMARY OF THE INVENTION

The downrigger includes a casing in which is mounted an electrically actuated power package which includes a reversible electric motor. A reel for a line is drivingly connected to the power package. Switch means are provided to actuate the motor in the forward or reverse direction to extend or retract the line on the reel. Electrical control means are connected to the motor to cause de-energization of the motor upon retraction of a line on the reel to a desired extent.

IN THE DRAWINGS

FIG. 3 is a top plan view of the downrigger of FIG. 2 with the top cover removed;

FIG. 4 is a sectional view of the downrigger taken substantially along the line 4—4 of FIG. 3 looking in the direction of the arrows;

FIG. 5 is a sectional view of a portion of the downrigger taken substantially along the line 5—5 of FIG. 4 looking in the direction of the arrows;

FIG. 6 is a sectional view of the downrigger taken substantially along the line 6—6 of FIG. 4 looking in the direction of the arrows.

Figure 1:
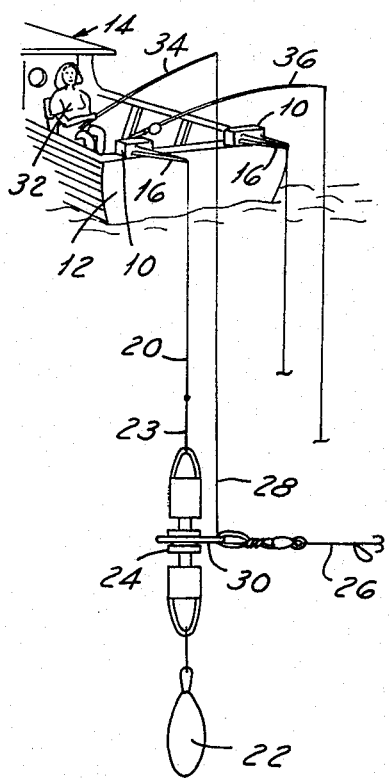
FIG. 1 is a view in perspective of a fishing boat rigged for fishing, the rigging including the downrigger of the present invention.
Figure 2:
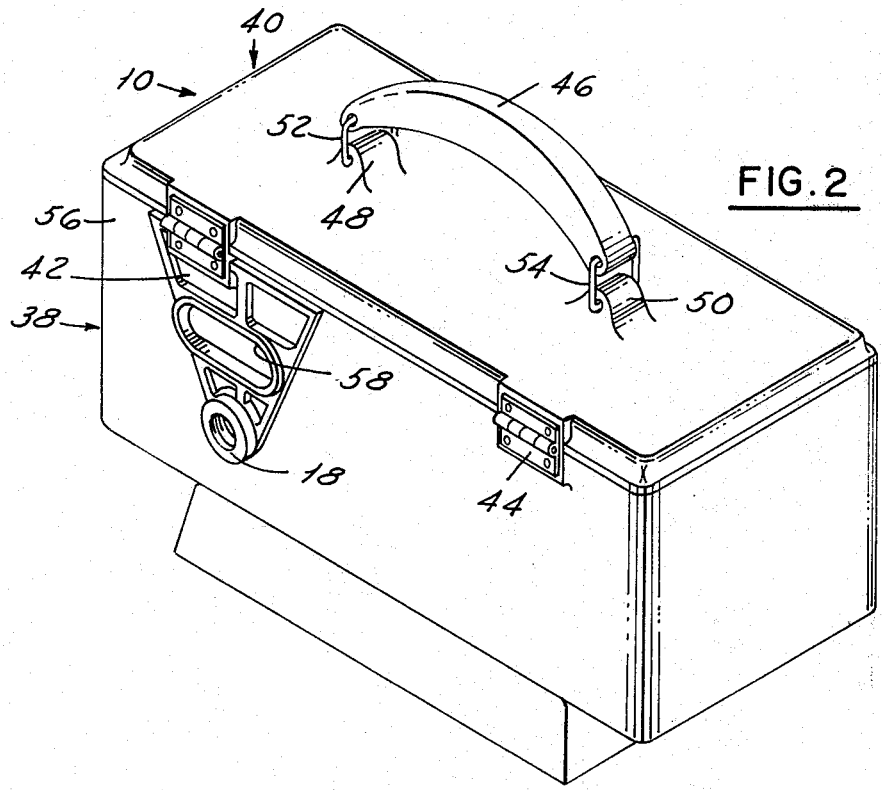
FIG. 2 is a view in perspective of one embodiment of the downrigger of the present invention.

Referring first to FIG. 1, it will be noted that a pair of downriggers 10 are mounted on the stern 12 of a fishing boat 14. Each downrigger is provided with a relatively short pole 16 which is screwed into a socket 18 (FIG. 2). The function of the downrigger 10 is to raise and lower a metal line 20 at the lower end of which is secured, by means of a short length of electrically non-conducting line 23 such as nylon, a relatively heavy metal weight 22. Downriggers are conventionally used in connection with deep water fishing such as is commonly practiced on the Great Lakes and the oceans. The weight 22 conventionally varies from, for example, one pound to thirty pounds. The particular weight a fisherman will use depends upon the type of fishing which he is doing, the depth at which he is fishing, whether or not he is trolling or standing still, the presence of currents in the water in which he is fishing and the like. Typically, the pole or rod 16 may be one-half inch in diameter at the base, tapering to approximately three-sixteenths of an inch in diameter at the outer end. The line 20 is frequently a woven wire received on a reel within the downrigger 10. Footage of 400 feet are common, the length depending upon the diameter of the line with respect to a given reel diameter.

A fishline release mechanism 24 is provided in the line 20 above the weight 22. The function of the release mechanism 24 is to detachably secure a fishhook 26 and fishline 28 to the weighted line 20 until a fish bites the hook 26 whereupon the efforts of the fish to free itself cause releasable fastener 30 to become disconnected from the release mechanism 24 thereby permitting the fisherman 32 to play the fish in the usual fashion by means of the fishing rod 34 to which the fishing line is secured. FIG. 1 illustrates the advantages of using the downrigger 10 because, as will be noted, the fisherman can actively play the fish by means of one rod 34 while a second rod 36 remains unattended, thus permitting the fisherman to play the fish while at the same time having a second line in the water to attract a second fish.

Referring now to FIG. 2, it will be noted that the downrigger 10 comprises a box-like structure including an open-topped lower container portion 38 having a cover 40 secured thereto by means of hinges 42, 44. A carrying handle 46 is provided on cover 44. The handle 46 is pivotally attached to projections 48, 50 on the cover by means of connectors 52, 54. The side 56 of the container portion includes the previously mentioned threaded socket 18. An oval slot 58 is provided above the socket for passage of the line 20 into and out of the downrigger. As will be noted in FIG. 6, a threaded metal insert 60, preferrably brass, is press fitted into an opening in the side 56 with the outer end being subsequently flared at 62 to hold the insert securely in place. A metal grommet 64 is fitted into the slot 58 with the outer endges 66, 68 being subsequently flanged to retain the grommet in place.

A base 70 is provided on the underside of the downrigger. As will be noted in FIGS. 4 and 5, the base includes an upper wall 72 from which projects a downwardly extending cup-shaped structure 74. A recessed opening 75 is provided in the bottom wall 76 of the container portion 38 through which a bolt 78 extends. A downwardly projecting portion 80 on the base having opening 81 defines a recess into which is received a nut 82 which is threadingly received on the shank of the bolt 78 to thereby secure the base 70 to the container portion 38. The base upper wall 72 has a central recessed portion 84 which receives a circular downwardly extending flange 86 provided on the underside of wall 76. A downwardly projecting pin portion 88 extends from the underside of wall 76. A pair of openings 90, 92 (FIG. 5) are provided in the bottom of recessed portion 84 to receive the pin portion 88. The pin portion may be received in either of the openings to orient the downrigger at positions varying by 90°. At this point, it should be noted that the container portion 38, cover 40 and base 70 are indicated as being fabricated of a plastic material. Preferably, these elements are molded of a suitable tough plastic for rugged use. However, as will be appreciated, other materials may be used as desired to form these elements.

The base 70 is secured to a support structure 94, as for example, the transom of the boat. An opening 96 is provided in each corner of the base 70 to receive a bolt or screw for suitably securing the base 70 to the support structure 94 as illustrated at 98 in dotted lines.

Referring now to FIGS. 3, 4 and 6, it will be noted that a reel 100 is mounted within the container portion 38. The reel 100 normally receives the line 20 (not shown). A pair of guides 102, 104 extend downwardly from the cover 40 into contact with opposite sides of the reel 100 to assure accurate rotation of the reel. The reel 100 is secured to the output shaft 106 extending from power package 108 by means of a bolt 110 which is threadingly received on threaded portion 112 extending outwardly from the end of the shaft 106.

The reel 100 has an axially projecting portion 114 at one end in which is formed a groove to receive a drive belt 116. The drive belt 116 extends through an opening in wall 118 into driving engagement with a pulley 120. The pulley 120 is mounted on a shaft 122 extending outwardly from a counter 124. The counter 124 is secured to wall 118 by means of nut and bolt structure 126. The counter 124 registers in feet. Rotation of the reel 100 to extend the line results in registering the approximate number of feet which the line has been extended whereupon the fisherman will know how deep the weight 22 is. A more exact figure may be secured by correlating the counter with the diameter of the line on the reel or by directly from the line. The fisherman may stop the reel whenever desired so that he will be fishing at the desired depth in the water. Upon retraction of the line, the counter is returned to its zero position so that each time the line is extended, a new reading will appear on the counter.

The power package 108 comprises an electric motor and transmission mounted within a single housing. The motor is preferably a 12-volt direct current motor which may conveniently be operated by means of the power supply normally provided on a boat. The motor must be a reversible motor so that the reel 100 may be rotated in either direction to extend or retract the line.

The power package 108 is secured within the container portion 38 by means of a removable wall 128. The wall 128 is slidably received in guides 130, 132 (FIG. 3) and a channel 134 (FIG. 4) provided on the lower wall of the container portion 38. The wall 128 has a central opening 138 through which portion 140 of the power package extends. The power package is fixedly secured to the wall by means of bolts 142. The power package plus reel may be easily removed as a unit for repair or maintenance purposes merely by disconnecting the belt 116. Disassembly of the reel from the power package and from the wall 128 is easily accomplished by removing the threaded fasteners.

A spring operated plunger 144 is received in a downwardly extending hollow projection 146 provided on the underside of the cover 40. The plunger 144 presses against the peripheral surface of the rim of one side of the reel 100 and acts as a brake or damper in movement of the reel. This braking action is sufficient to prevent rotation of the reel as a consequence of the weight 22 when the line has been extended or retracted by means of the power package 108. Thus, when the line is lowered to a certain depth, it will not descend further as a consequence of the weight attached to the end of the line. When the line is retracted, it will stay retracted as a consequence of the braking action. When it is desired to lower the line without resorting to the power package, the plunger may be manipulated out of engagement with the reel whereupon the weight 22 will cause the reel to rotate and extend line.

Figure 7:
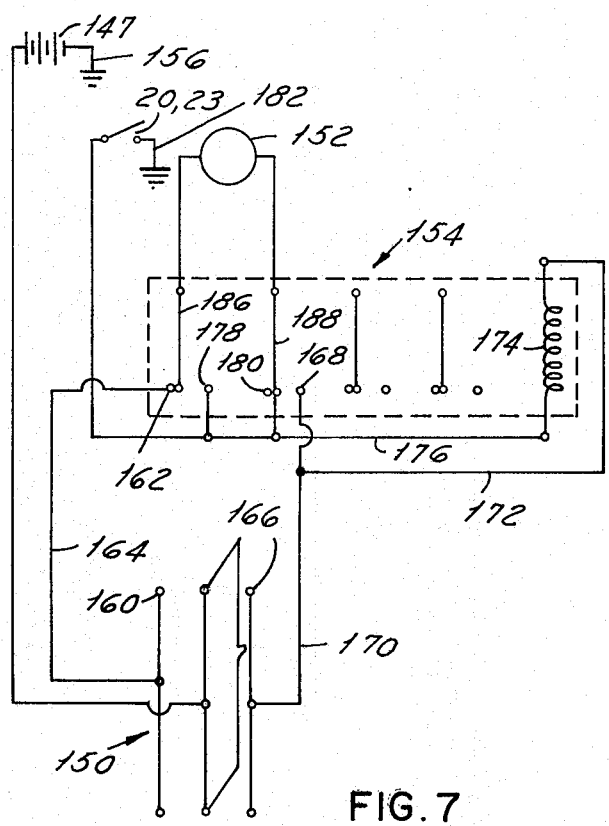
FIG. 7 is a schematic illustration of the electrical circuitry utilized to actuate the downrigger.

FIG. 7 illustrates the electrical circuitry involved in activating the power package 108. As will be noted, a double pole, double throw, center off switch 150 is provided to manipulate connections with the power supply 147, normally the battery of the boat. The motor 152 is controlled from the switch 150 and a relay 154. The negative side of battery 149 is grounded at 156, the boat being the ground. The positive side of the battery is connected to the arms of switch 150 via lead 158. The contacts 160 on one side of the switch are connected to a contact 162 of relay 154 via lead 164. The contacts 166 on the other side of the switch are connected to a contact 168 of the relay via lead 170. A lead 172 extends from lead 170 to one side of relay coil 174. The other side of relay coil 174 is connected to ground via lead 176. Lead 176 is also connected to contacts 178, 180 of the relay. The ground 182 is the water surrounding the boat. This ground is the same as the ground of the boat. The short length of nylon 23 along with the metal line 20 acts as a switch to open and close ground. The metal line 20 provides a good ground until the line 20 has been retracted to pull the nylon portion 23 out of the water. The nylon, being a non-conductor, breaks the connection to ground thus de-energizing the motor 152.

Operation of the circuit may now be understood. Representatively, movement of the switch arm to the left as viewed in FIG. 7 is assumed to drive the motor 152 in the forward direction while moving it to the right as viewed in FIG. 7 is assumed to drive the motor in the reverse direction. Assuming that the switch arm is closed to the left, it will be noted that the relay 154 is not energized. Consequently, the relay will be in a position shown with the left side of the motor 152 connected to the positive side of the battery 149. The right side of the motor will be connected to ground, assuming that the metal line 20 is in the water.

Throwing of the switch to the right as viewed in FIG. 7 will result in connecting the motor in the reverse polarity. The coil 174 is energized, it being noted that the ground connection is made through the metal line 20, the other side of the relay being connected to the positive side of battery 149. This results in pulling the relay arms 186, 188 to the right as viewed in FIG. 7. The right side of the motor will now be connected to the positive side of battery 149 with the left side being connected to ground, thus reversing the polarity on the motor causing the motor to operate in the reverse direction. Upon retraction of the motor, by throwing the switch to the right as viewed in FIG. 7, the entire system is de-energized upon the nylon portion 23 emerging from the water. At this time, the brake element 144 will hold the system in the retracted position. Upon release of the brake, the metal line 20 will again enter the water as a result of weight 22 and the switch may then be thrown to the left to unwind the line as desired. When the desired length of line has been let out, the switch is thrown to the center position thus de-energizing the motor. The desired length of line may, of course, be noted by means of the counter 124.

I claim:

1. A downrigger comprising a casing, an electrically actuated power package including a reversible electric motor mounted in said casing, channel means within said casing, a support partition slidably received in said channel means, said power package being mounted on said support partition whereby the power package may be removed by sliding the support partition out of the channel means, a reel for a line drivingly connected to the power package, switch means between said motor and a source of electrical power to actuate said motor in the forward or reverse direction to extend or retract a line on the reel, and electrical control means connected to said motor to cause de-energization of the motor upon retraction of a line on the reel to a desired extent.

2. A downrigger as defined in claim 1, further characterized in that said support partition includes an opening therethrough, said power package having an output shaft, a portion of said power package including the output shaft extending through the opening, detachable fastening means securing said power package to the support partition, the reel being detachably fastened to the output shaft of the power package.

3. A downrigger comprising a casing, an electrically actuated power package including a reversible electric motor mounted in said casing, a reel for a line drivingly connected to the power package, switch means between said motor and a source of electrical power to actuate said motor in the forward or reverse direction to extend or retract a line on the reel, electrical control means connected to said motor to cause de-energization of the motor upon retraction of a line on the reel to a desired extent, and an electrically conductive line received on and attached at one end to said reel, said line having a nonelectrically conductive portion on the outer end thereof, an electrically conductive portion of said line being electrically attached to the motor to form the ground for the motor, said ground being made by contact of an electrically conductive portion of the line with water, retraction of the line out of water to a point where the electrically conductive portion is out of contact with the water resulting in disconnecting the motor from ground and de-energizing the motor.

* * * * *